United States Patent
Palan et al.

(10) Patent No.: US 10,621,600 B2
(45) Date of Patent: Apr. 14, 2020

(54) METHOD FOR ANALYZING WEBSITE VISITORS USING ANONYMIZED BEHAVIORAL PREDICTION MODELS

(71) Applicant: LiveRamp, Inc., San Francisco, CA (US)

(72) Inventors: Vivek Palan, San Francisco, CA (US); Brian Frederick Killen, Berlin (DE); Noel Bradley McMichael, San Francisco, CA (US); Frank Ledo, Berkeley, CA (US); Paul Owen, Bend, OR (US)

(73) Assignee: LiveRamp, Inc., San Francisco, CA (US)

( * ) Notice: Subject to any disclaimer, the term of this patent is extended or adjusted under 35 U.S.C. 154(b) by 1568 days.

(21) Appl. No.: 14/479,022

(22) Filed: Sep. 5, 2014

(65) Prior Publication Data

US 2015/0088612 A1    Mar. 26, 2015

Related U.S. Application Data

(60) Provisional application No. 61/881,110, filed on Sep. 23, 2013.

(51) Int. Cl.
*G06Q 30/02* (2012.01)
*G06F 16/29* (2019.01)
(Continued)

(52) U.S. Cl.
CPC ......... *G06Q 30/0202* (2013.01); *G06F 16/29* (2019.01); *G06F 16/951* (2019.01);
(Continued)

(58) Field of Classification Search
CPC .............. G06Q 30/00; G06Q 30/0205; G06Q 30/0255; G06Q 30/02; G06Q 30/0204;
(Continued)

(56) References Cited

U.S. PATENT DOCUMENTS

| 6,073,140 A | 6/2000 | Morgan et al. |
| 6,334,110 B1 | 12/2001 | Walter et al. |

(Continued)

FOREIGN PATENT DOCUMENTS

| WO | WO0154034 | 7/2001 |
| WO | WO2007106693 | 9/2007 |

OTHER PUBLICATIONS

Dwyer, Catherine, "Behavioral Targeting: A case study of consumer tracking on levis.com," Proceedings of the fifteenth Amiricas Confernce on Informaiton Systems, San Francisco, CA Aug. 6-9, 2009, <http://citeseerx.ist.psu.edu/viewdoc/download?doi=10.1.1.215.7616&rep=rep1&type=pdf>.*

(Continued)

*Primary Examiner* — Renae Feacher

(57) ABSTRACT

A method for analyzing web visitors using anonymized behavior production models begins with a website visitor accessing a website. The website includes a web beacon, which redirects the website visitor's browser to the server of a marketing services provider (MSP). The MSP server reads a cookie previously set by the MSP that includes an anonymous link. The anonymous link may be used to match data related to the website visitor that is maintained by the MSP, and browsing activity for that visitor is stored in an activity database from which periodic reports may be constructed for the website owner. The anonymous link is not associated with any personally identifiable information (PII), and thus privacy for the visitor is maintained.

20 Claims, 3 Drawing Sheets

(51) Int. Cl.
*G06F 16/951* (2019.01)
*G06F 11/34* (2006.01)

(52) U.S. Cl.
CPC ...... *G06Q 30/0205* (2013.01); *G06F 11/3438* (2013.01); *G06F 2201/875* (2013.01); *G06F 2201/88* (2013.01)

(58) Field of Classification Search
CPC .............. G06Q 20/383; G06F 21/6254; G06F 11/3438; G06F 2201/875
See application file for complete search history.

(56) References Cited

U.S. PATENT DOCUMENTS

| | | | |
|---|---|---|---|
| 6,523,041 | B1 | 2/2003 | Morgan et al. |
| 6,766,327 | B2 | 7/2004 | Morgan, Jr. et al. |
| 6,850,988 | B1 | 2/2005 | Reed |
| 7,165,105 | B2 | 1/2007 | Reiner et al. |
| 7,246,150 | B1 | 7/2007 | Donoho et al. |
| 7,360,251 | B2 | 4/2008 | Spalink et al. |
| 7,552,069 | B2 | 6/2009 | Kepecs |
| 7,698,422 | B2 | 4/2010 | Vanderhook et al. |
| 7,739,594 | B2 | 6/2010 | Vasilik |
| 8,019,881 | B2 | 9/2011 | Sandhu et al. |
| 8,027,864 | B2 | 9/2011 | Gilbert |
| 8,082,332 | B2 | 12/2011 | Gilbert |
| 8,095,450 | B2 | 1/2012 | Walker et al. |
| 8,150,979 | B1 | 4/2012 | Oldham |
| 8,229,787 | B2 | 7/2012 | Ramchandani et al. |
| 8,234,159 | B2 | 7/2012 | Heiser, II et al. |
| 8,255,489 | B2 | 8/2012 | Afergan et al. |
| 8,271,329 | B2 | 9/2012 | Levine et al. |
| 8,302,169 | B1 | 10/2012 | Presotto et al. |
| 8,352,318 | B2 | 1/2013 | Rikhtverchik et al. |
| 8,359,236 | B1 | 1/2013 | Ranganath et al. |
| 8,468,271 | B1* | 6/2013 | Panwar .............. G06Q 30/0615 370/469 |
| 8,499,099 | B1 | 7/2013 | Kogan |
| 8,626,697 | B1* | 1/2014 | Chaine .................. G06F 16/957 706/50 |
| 9,818,131 | B2* | 11/2017 | Yonebayashi ...... G06Q 30/0255 |
| 2003/0158960 | A1 | 8/2003 | Engberg |
| 2004/0044566 | A1 | 3/2004 | Bostelmann et al. |
| 2005/0120045 | A1 | 6/2005 | Klawon |
| 2005/0177613 | A1 | 8/2005 | Dresden |
| 2007/0038516 | A1 | 2/2007 | Apple et al. |
| 2007/0067297 | A1 | 3/2007 | Kublickis |
| 2008/0086365 | A1 | 4/2008 | Zollino et al. |
| 2008/0086558 | A1 | 4/2008 | Bahadori et al. |
| 2008/0091535 | A1 | 4/2008 | Heiser, II et al. |
| 2008/0147480 | A1* | 6/2008 | Sarma ................... G06Q 30/00 705/14.53 |
| 2008/0270398 | A1 | 10/2008 | Landau et al. |
| 2008/0313011 | A1 | 12/2008 | Rose et al. |
| 2009/0187520 | A1 | 7/2009 | Liu et al. |
| 2009/0248496 | A1 | 10/2009 | Hueter et al. |
| 2009/0248523 | A1* | 10/2009 | Hueter ................... G06Q 10/00 705/14.53 |
| 2009/0281895 | A1 | 11/2009 | Selinger et al. |
| 2009/0282052 | A1 | 11/2009 | Evans et al. |
| 2010/0057560 | A1 | 3/2010 | Skudlark et al. |
| 2010/0169803 | A1* | 7/2010 | Mazzei ................. G06Q 30/02 715/760 |
| 2010/0268739 | A1 | 10/2010 | Zalepa |
| 2010/0287050 | A1 | 11/2010 | Jones et al. |
| 2011/0029382 | A1 | 2/2011 | Narasimhan et al. |
| 2011/0029393 | A1 | 2/2011 | Apprendi et al. |
| 2011/0054920 | A1 | 3/2011 | Phillips et al. |
| 2011/0060905 | A1 | 3/2011 | Stack et al. |
| 2011/0078004 | A1 | 3/2011 | Swanson, Sr. |
| 2011/0185016 | A1 | 7/2011 | Kandasamy et al. |
| 2011/0191140 | A1 | 8/2011 | Newman et al. |
| 2011/0191664 | A1 | 8/2011 | Sheleheda et al. |
| 2011/0258016 | A1 | 10/2011 | Barak et al. |
| 2011/0258050 | A1 | 10/2011 | Chan et al. |
| 2011/0264992 | A1 | 10/2011 | Vishria et al. |
| 2011/0270661 | A1 | 11/2011 | Heiser, II et al. |
| 2011/0276408 | A1 | 11/2011 | Toole |
| 2011/0282943 | A1 | 11/2011 | Anderson et al. |
| 2012/0023390 | A1 | 1/2012 | Howes et al. |
| 2012/0109734 | A1 | 5/2012 | Fordyce, III et al. |
| 2012/0150641 | A1* | 6/2012 | Dobbs ................... G06Q 30/02 705/14.53 |
| 2012/0173345 | A1 | 7/2012 | Yanefski et al. |
| 2012/0185503 | A1 | 7/2012 | Chamberlain et al. |
| 2012/0323682 | A1 | 12/2012 | Shanbhag et al. |
| 2013/0067588 | A1 | 3/2013 | Roy et al. |
| 2013/0085804 | A1 | 4/2013 | Leff et al. |
| 2013/0179440 | A1 | 7/2013 | Gordon |
| 2013/0179988 | A1 | 7/2013 | Bekker et al. |
| 2013/0276136 | A1* | 10/2013 | Goodwin ................ H04L 67/22 726/27 |
| 2013/0013695 | A1 | 11/2013 | Jin et al. |

OTHER PUBLICATIONS

"Analyze Your Site for Free with Google Analytics," Dummies, Google 2008, < https://www.dummies.com/web-design-development/search-engine-optimization/analyze-your-site-for-free-with-google-analytics/>.*

Faber, E., Haaker, T., Bouwman, H.; Balancing Requirements for Customer Value of Mobile Services; 17th Bled eCommerce Conference eGlobal, Bled, Slovenia, Jun. 21, 2004.

Neolane Introduces New Features that Transform Anonymous Marketing Prospects into Loyal Customers; Apr. 18, 2012; Business Wire; DialogWeb.

Oracle White Paper; How to Win Online: Advanced Personalization in E-Commerce; Mar. 2011.

Andersson, F.; Hagstrom, S.; Dynamic Identities for Flexible Access Control; Master Thesis Computer Science No. MCS-2005:18; Blekinge Institute of Technology; Sweden; Aug. 2005.

Borgesius, F.; Sloot, B. V.D.; Google and Personal Data Protection; Universiteit van Amsterdam; 2012.

Pega Next Best Offer for Financial Services; Pegasystems; 2011.

www.Angoss.com; Sales and Marketing Next Best Offer, 2013.

Chang, H.; Hung, L; Ho, C.; An Anticipation Model of Potential Customers' Purchasing Behavior Based on Clustering Analysis and Association Rules Analysis; Expert Systems with Applications 32 (2007) 753-764; Elsevier.

Cutroni, J.; Merging Google Analytics with your Data Warehouse; Analytics Talk; httpl://cutroni.com; May 5, 2011.

Kaushik, A.; Google Analytics Visitor Segmentation: Users, Sequences, Cohorts!; Occam's Razor; www.kaushik.net; Sep. 9, 2013.

* cited by examiner

METHOD FOR ANALYZING WEBSITE VISITORS USING ANONYMIZED BEHAVIORAL PREDICTION MODELS

CROSS-REFERENCE TO RELATED APPLICATIONS

This application claims the benefit of U.S. provisional patent application No. 61/881,110, filed on Sep. 23, 2013, and entitled "Method for Analyzing Website Visitors Using Anonymized Behavioral Prediction Models." Such application is incorporated herein by reference in its entirety.

STATEMENT REGARDING FEDERALLY SPONSORED RESEARCH OR DEVELOPMENT

Not applicable.

BACKGROUND OF THE INVENTION

An ever-increasing number of products and services are being sold or marketed over the World Wide Web and other online channels. For example, marketers such as retailers may provide a website where customers can learn about and purchase the marketer's own products and services. In addition, websites, social media, and other online channels are being used to market these goods and services through third-party sites maintained by a party other than the marketer itself. The third-party website owners may receive income from advertising revenue paid by the marketer, either directly or indirectly, with the revenue received by the third-party website owner being based in part upon the traffic it receives through "impressions" delivered to users viewing its website and/or "click throughs" by users who actually click on an advertisement. Regardless of whether the owner of the website is a marketer itself or a third party providing advertising space or services for the marketer, the website owner may benefit from gathering useful and accurate information about the website's visitors. Desirable information about the website visitor would include data that indicates or tends to indicate whether the visitor is more likely to actually purchase the goods and services offered by the marketer.

Although gathering additional information about website visitors would be of significant value to the website owner and the marketer, the protection of the privacy of website visitors must remain a critical concern. Any website visitor information gathered or discerned must comply with privacy laws, regulations, and industry best practices. In particular, the use of personal identifying information (PII) concerning these website visitors—such as name, address, telephone number, and email address information—is often restricted in online transactions throughout many jurisdictions in order to protect user privacy. Thus any attempt to better understand consumer behavior in an online, multi-channel marketing environment must ensure that the PII of the website visitor is not used in any manner that would compromise the privacy of the website visitor.

Because of the limitations on the use of PII in online marketing due to privacy concerns, most attempts to gather information about website visitors are limited to "clickstream" data, that is, information about which websites a particular visitor has previously visited during web browsing sessions. This information may, for example, be discerned from cookies stored in the website visitor's web browser. This information itself does not contain any PII, and thus its use does not raise the same privacy concerns that may be raised if this clickstream data were combined with name, address, or similar information by the marketer. But the utility of this information is quite limited for the website owner. Attempts to infer a website visitor's intentions, behavioral attributes, demographics, or buying propensities based simply on websites previously visited by that website visitor often result in errors. Thus a method for more accurately determining important traits of the website visitor as a potential customer, while also maintaining the privacy for the website visitor by avoiding the exposure of the website visitor's PII to the marketer or third-party website owner, would be highly desirable.

BRIEF SUMMARY OF THE INVENTION

The present invention in certain aspects is directed to a computer-implemented method for analyzing website visitors using anonymized behavioral prediction models, whereby reports are generated for analysis by the website owner but in which no PII is provided to the website owner. The process may begin with the request by a consumer browsing the web to view a particular website. The website contains a redirect that, when called, sends the browser of the consumer to a marketing services provider (MSP) server. The MSP server receives the redirect and reads an identifier stored at the consumer device to determine an anonymous link associated with the consumer. The MSP then searches a secure area for consumer data associated with the anonymous link. The MSP records the activity associated with this consumer data in an activity database. By tracking activity, the MSP may produce periodic reports to the website owner about its website visitors, but since those reports do not include PII, the privacy of each individual consumer who visited the website is protected.

These and other features, objects and advantages of the present invention will become better understood from a consideration of the following detailed description of certain embodiments and appended claims in conjunction with the drawings as described following:

DETAILED DESCRIPTION OF THE PREFERRED EMBODIMENT(S)

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

In the various embodiments of the invention described herein, several parties may be involved in the multichannel marketing and analysis. These parties include a marketing services provider, who provides services that enable the website analytics as described herein; marketers who are promoting their products or services via websites, social media sites, and other online channels; third-party sites such as content publishers including news, entertainment, and other websites that include advertisements in their content as, for example, a source of revenue or to advertise their own products or services (in which case they may also be marketers); and the consumers who, as website visitors, ultimately purchase the goods and services offered by the marketers through various online channels. Each of these parties may operate computing devices that are interconnected over the Internet. The marketing services provider, marketers, and publishers may use specially programmed computer servers to provide the various functionality described herein. Consumers may access the various components of this system utilizing consumer computing devices capable of accessing the Internet, including but not limited to devices such as desktop computers, laptop computers, tablets, and smartphones, as well as other types of web-connected, embedded devices, such as televisions. Such components are further described below with reference to FIG. 3.

Figure 1:
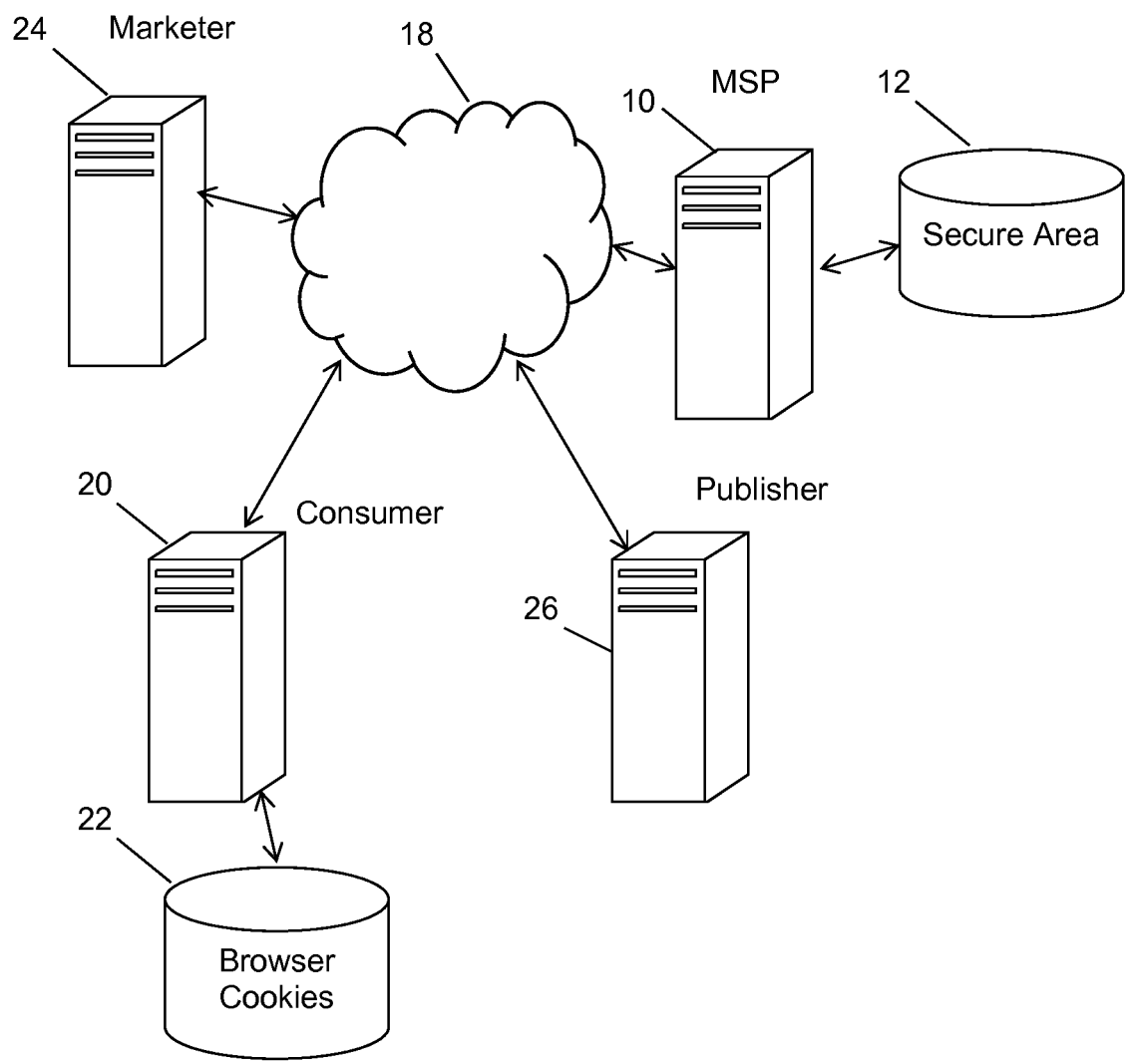
FIG. 1 is a diagram showing a networked system according to certain embodiments of the present invention.

A system for implementing the invention as described herein is depicted in FIG. 1. Marketing services provider (MSP) 10 provides a secure area 12 in which it maintains non-PII data for use of the various embodiments of the invention. Data maintained in secure area 12 may be used in ways that otherwise would not be possible for online marketing transactions. Data in secure area 12 is stored in records, each of which is linked by an anonymous link. An anonymous link may be, for example, an alphanumeric identifier that is unique for that record across all of the records maintained in secure area 12. The anonymous link is not used for linking consumer data in other databases or data storage areas that include PII, even other areas operated by the MSP. In this manner, a party that gains access to the anonymous link for any consumer will be unable to use the anonymous link in order to surreptitiously identify the consumer about whom the data pertains, and cannot use the anonymous link as a means of actually identifying the individual consumer. The anonymous link is used only with records that contain information about a particular consumer, but no PII about that consumer. For example, a particular record in secure area 12 may contain information that a consumer associated with that record is currently in the market for a new vehicle, and further may contain information about the income range for that consumer. The record does not, however, contain the name of the individual or other identifying information. Thus although anonymous link is used to link this particular record that contains information that is of value to marketers, it cannot be used to ever identify the individual outside of the MSP. Anonymous links may be constructed from consumer links used by the MSP to link records in other databases that contain PII, but the anonymous links are constructed from the consumer links in a manner that prevents anyone from reconstructing the consumer link from the anonymous link.

Prior to use of the various embodiments of the invention, secure area 12 is populated with data from one or more sources. These sources may include information collected by the MSP that may be originally placed in secure area 12 or be pulled from other databases that the MSP maintains; from the marketer to whom the MSP is providing services, such as its own internal customer database databases; from an agency representing the marketer; or from third parties that maintain their own consumer databases. This data may include, for example, many types of demographic and buying propensity (e.g., "in market") information as described above. In the case of information from the marketer, it may include information that would only be known by the marketer, such as how frequently a customer purchases from the marketer, or how long it has been since the consumer has purchased from the marketer. Since this information is linked only by the anonymous link and not connected with any PII after secure area 12 is populated, there is no risk of a loss of privacy for any consumer who visits websites associated with these various embodiments of the present invention, despite the depth and breadth of data that secure area 12 may contain in these embodiments.

MSP 10 is in electronic communication over network 18 with one or more consumers 20. Consumers 20 each are communicating with MSP 10 through a consumer computing device, as described previously. The web browser of consumer computing device includes browser cookies 22 that have been accumulated and stored as a result of web browsing activity by consumer 20. These cookies may be accessed by software associated with a website when a consumer clicks on an associated link during a web browsing session to reach that website. The general function of browser cookies is well known in the art. MSP 10 and consumers 20 are further interconnected in electronic communication over network 18 with marketer 24 and publisher 26, each of which maintains content that is accessible by a web browser operated by each consumer 20.

There may be any number of marketers 24 who participate in the services provided by MSP 10. In various embodiments, MSP 10 may maintain separate secure areas 12 for each marketer, in order to facilitate the use of data from each marketer in processing for that particular marketer, while preventing the sharing of data between marketers or the direct or indirect use by one marketer of data provided by another marketer. This further serves to secure the privacy of consumers, in addition to the avoidance of PII in secure area 12. This feature also serves to protect sensitive competitive data that may be collected by each marketer 24, and which it must ensure is not disclosed to any third party.

There may be any number of publishers 26, such as the thousands or even millions of websites currently accessible to consumers over the Internet and that use third-party advertising as one or the only means of monetizing the content that they provide. Publishers 26 may broadly include not only those parties that operate websites that directly provide marketing information related to products and services, but also those that provide links to this information, such as social media sites that maintain online conversations between consumers.

Figure 2:
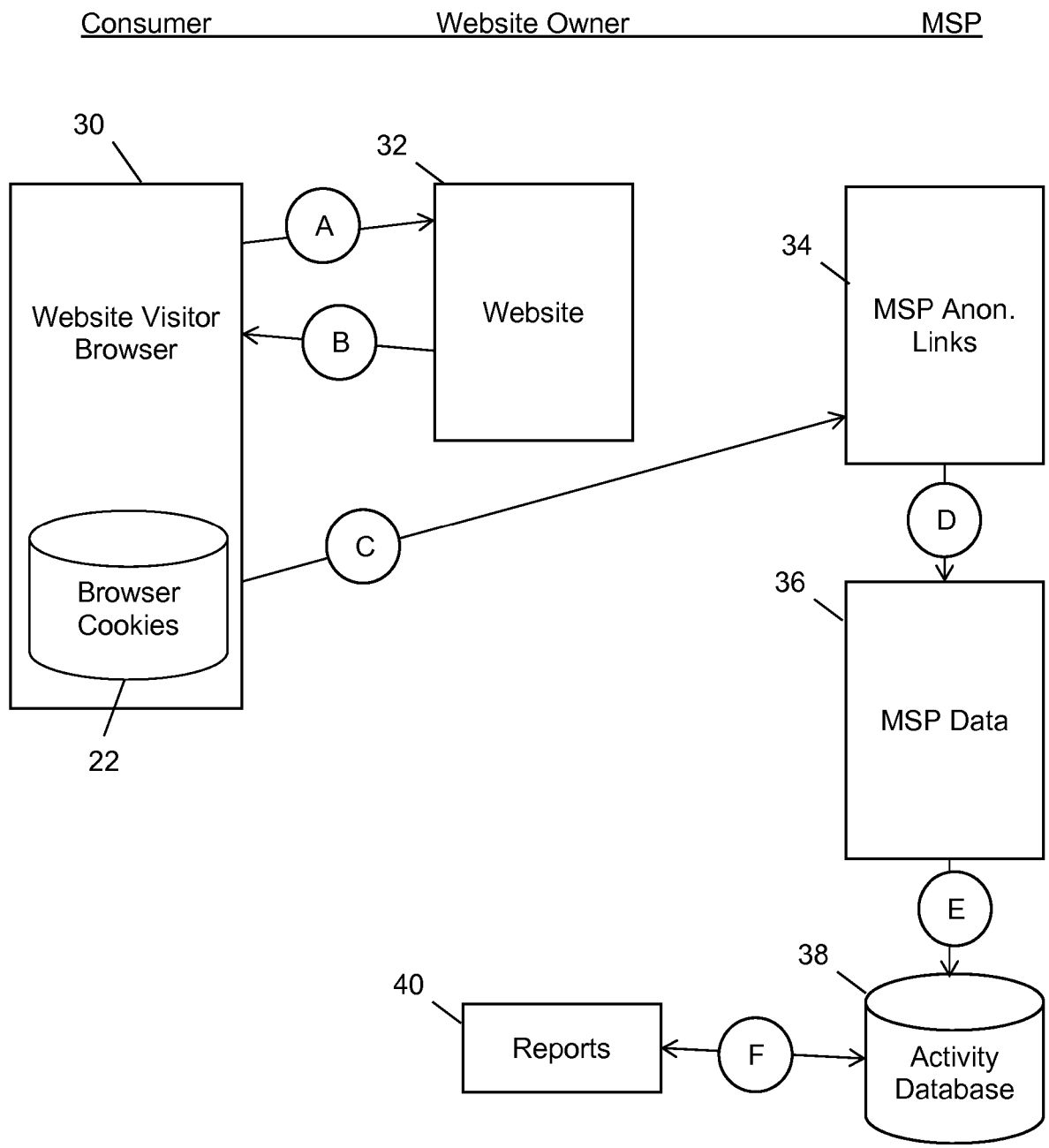
FIG. 2 is a flow chart depicting a process according to certain embodiments of the present invention.

Turning now to FIG. 2, processing according to certain embodiments of the present invention may be described. The web browser software of the consumer who is visiting various websites is graphically represented at process block 30. At step A, the consumer acting through the browser requests to view a particular website, such as when the consumer types in a website address, clicks on a link, scans a QR code, or other such activity. The process then moves to the website of the marketer or the publisher advertising a marketer's products or services, graphically represented at block 32. The website contains a web beacon or web pixel, which is a small section of code known in the art as a means to redirect a web browser to a server other than the server housing the main part of a particular website. At step B, the website 32 sends back to browser 30 the webpage that was requested, along with the web pixel beacon. At process step C, the browser then calls the server with the IP address associated with the pixel beacon. The pixel beacon IP address leads to the server operated by the marketing services provider (MSP), which houses a list of anonymous links, the links here being represented graphically by process block 34.

The anonymous links in certain embodiments are each uniquely associated with a particular consumer, and thus the anonymous link enables the MSP to positively and uniquely identify consumer 20, but does so without the use of any PII related to that consumer. The term "identify" is used here in the sense of distinguishing the consumer data from data associated with others, but not to use or assign any PII such as name, address, telephone number, or email address. The anonymous links are created as described above in a non-reversible manner, such as hashed forms of other links that are uniquely associated with a particular consumer, consumer address, or like information specific to a particular consumer. The hash function is a one-way function, so that the original link cannot be reverse engineered from the anonymous link. The anonymous links are used to uniquely differentiate data associated with a particular consumer, but no PII is associated with the anonymous links to preserve consumer privacy.

One or more of the cookies that are stored at browser cookies 22 of website visitor browser 30 may be associated with one of the anonymous links. Once redirected to the MSP 10, the new link causes the MSP to access browser cookies 22 on the consumer device associated with browser 30 in order to determine if a cookie previously set by the MSP is found there. This cookie, if found, is retrieved for further processing. The redirect that takes place at step C in certain embodiments takes place in a manner that is entirely transparent to the consumer, and in real time so that no undue delay is caused for the consumer who desires to view the material associated with website 32.

The MSP cookie contains the anonymous link associated with a consumer. Setting of the MSP cookie in browser cookies 22 occurs prior to the processing described herein. In certain embodiments, the cookie found in browser cookies 22 may not contain the anonymous link directly, but may instead contain information that allows the link to be looked up in tables maintained by the MSP. In certain embodiments of the invention, other types of identifiers for the consumer or the consumer device may be used in place of a cookie from browser cookies 22. These device identifiers may include, for example, those currently used by Google, Apple, and other companies for various purposes relating to the identification of a particular web user or a particular connected device. In the manner just described, data related to a particular consumer may be anonymously associated with that particular consumers through cookies stored at the consumer's web browser. Because the anonymous links are never associated with PII, there is no risk of a loss of privacy by putting the anonymous link in a cookie set in browser cookies 22 at website visitor browser 30.

Using the anonymous link that was read from the cookie in website visitor browser 30, at process step D desired information for the website visitor may be looked up in a store maintained by the MSP within secure area 12, represented graphically in FIG. 2 by MSP process data block 36. Information that may be looked up here may include market segments that are associated with groups of anonymous links. This may include, for example, data indicating that a consumer is "in market" for a particular product (vehicle, clothing, consumer electronics, etc.) It may also include a particular segment or "cluster" that is associated with the customer. For example, all consumers in a particular geographical area may be divided into various segments or clusters based on certain common attributes that are known to relate to particular consuming behavior, such as affluent, interested in outdoor activity, etc.

At process step E, the desired information about a particular consumer is stored in activity database 38. Activity database 38 maintains running counts of anonymous links that are requested by website visitors, which are recorded and made available to the website 30 owner. Reports 40 may then be created during process step F, such as weekly or monthly reports, which are generated by the MSP from the information at activity database 38 and provided to the owner of website 32. The information is provided in an aggregate form, and may be broken down in any manner based upon the various fields tracked in the data by the MSP. Reports 40 may further include third-party sourced data about the consumers to build a more complete portrait of the consumers that are accessing the website. For example, various demographic and propensity data may be included in the report along with the consumer browsing activity. Reports 40 may be presented in an infographic format for quick and easy understanding of the results by the website owner. Reports 40 may further include geographic data for a consumer, which may be from a third-party source or may be derived by geo-mapping to an IP address used by the consumer while browsing. In addition, geo-mapping to identify third-party data related to that geographic location, such as by using a ZIP code, which allows inferences about other demographic or related data about the website visitor, such as, for example, an income level. Consumers may further be divided into propensity groups based upon the results of the processes described herein. For example, a "chocolate lover" group may be determined based upon consumers browsing of websites for gourmet chocolates. Thus the data stored in activity database 38 may be used to create new propensity groups and may be used to further subdivide data concerning consumers engaged in online browsing activities.

In addition to the generation of reports, data from activity database may alternatively be returned to the website owner in real time such that it may be used simultaneously while the website visitor is visiting the website owner's site. In this way, targeted marketing messages may be generated while the visitor is still viewing the page that generated the data for activity database 38.

It may be seen that using these various embodiments of the invention, the website owner may gain a greater understanding of the types of consumers that are accessing its website, but since no PII concerning those consumers is provided to the website owner, there is no loss of privacy for the consumer. For example, the website owner may learn that the visitors to its website tend to be in a particular income bracket, which may be highly valuable to the website owner for its future marketing efforts, but the website owner is not provided with the name, address, telephone number, email address, or other personal information of any of those visitors, and this their privacy is fully protected.

It will be understood from the foregoing description that in various embodiments the present invention provides an enhanced understanding of web browsing consumers to a website owner that has provided a product or service offering, or to a publisher that advertises the products or services of others. It further provides a means for allowing the use of a wealth of consumer data, such as purchase history, demographic data, segment data, and the like, in order to better facilitate multichannel online marketing, without compromising the privacy of the consumer because no PII is made available. Marketers can use this understanding to better analyze the sources of consumer interest in their products and services, in order to allow the marketer to more appropriately focus its marketing activities, and those of the agencies with whom it may work, on the areas most likely to show a high return on their marketing investment. It further allows marketers to better understand the "viral" nature of their marketing messages by allowing analysis of the distribution of information about their products or services through social media and related channels.

Figure 3:
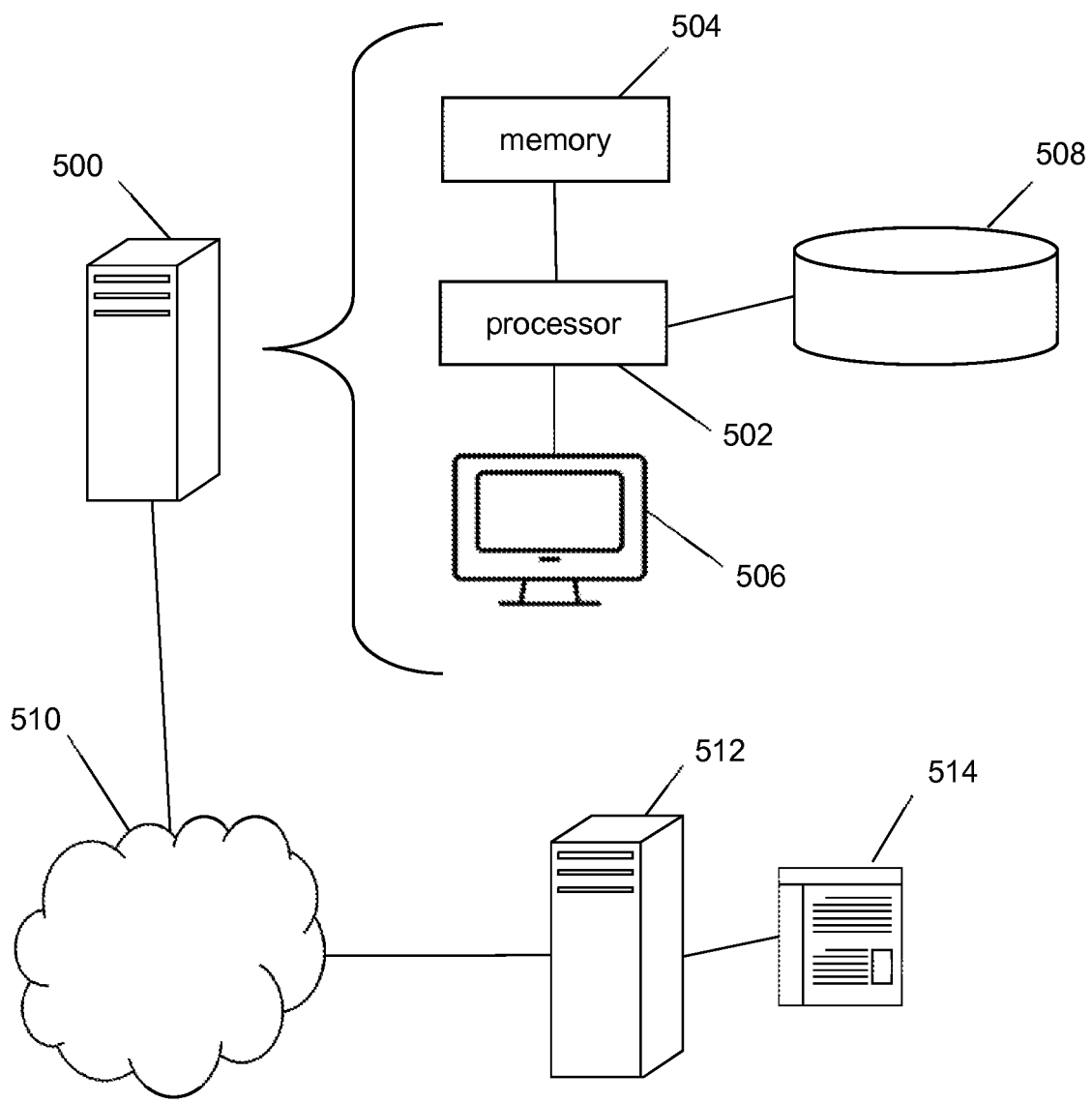
FIG. 3 is a diagram showing connected computing devices for implementing certain embodiments of the present invention.

The preferred embodiment of the invention is implemented as a number of computing devices 500 as illustrated in FIG. 3, each of which is programmed by means of instructions to result in a special-purpose computing device to perform the various functionality described herein. This is, for example, the manner in which the marketing services provider, marketer, and publisher provide their various functionality as described in the foregoing. Computing device 500 may be physically implemented in a number of different forms. For example, it may be implemented as a standard computer server as shown in FIG. 3 or as a group of servers, operating either as serial or parallel processing machines.

Computing device 500 includes in the server example of FIG. 3 microprocessor 502, memory 504, an input/output device or devices such as display 506, and storage device 508, such as a solid-state drive or magnetic hard drive. Each of these components is interconnected using various buses or networks, and several of the components may be mounted on a common PC board or in other manners as appropriate.

Microprocessor 502 may execute instructions within computing device 500, including instructions stored in memory 504. Microprocessor 502 may be implemented as a single microprocessor or multiple microprocessors, which may be either serial or parallel computing microprocessors.

Memory 504 stores information within computing device 500. The memory 504 may be implemented as one or more of a computer-readable medium or media, a volatile memory unit or units such as flash memory or RAM, or a non-volatile memory unit or units such as ROM. Memory 504 may be partially or wholly integrated within microprocessor 502, or may be an entirely stand-alone device in communication with microprocessor 502 along a bus, or may be a combination such as on-board cache memory in conjunction with separate RAM memory. Memory 504 may include multiple levels with different levels of memory 504 operating at different read/write speeds, including multiple-level caches as are known in the art.

Display 506 provide for interaction with a user, and may be implemented, for example, as an LCD (light emitting diode) or LCD (liquid crystal display) monitor for displaying information to the user, in addition to a keyboard and a pointing device, for example, a mouse, by which the user may provide input to the computer. Other kinds of devices may be used to provide for interaction with a user as well.

Various implementations of the systems and methods described herein may be realized in computer hardware, firmware, software, and/or combinations thereof. These various implementations may include implementation in one or more computer programs that are executable and/or interpretable on a programmable system including at least one programmable microprocessor 502, which may be special or general purpose, coupled to receive data and instructions from, and to transmit data and instructions to, a storage system, one or more input device, and one or more output device.

The computing system can include a consumer computing device, such as a desktop computer, laptop computer, tablet, or smartphone, or an embedded device. In the example of FIG. 3, a desktop computer is shown. In this case, client device 512 is the consumer computing device, and runs a web browser 514 in order to access the Internet 510, which allows interconnection with computing device 500. A client and server are generally remote from each other and typically interact through a communication network.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a grouping is used herein, all individual members of the group and all combinations and subcombinations possible of the group are intended to be individually included. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A computer-implemented method for anonymously analyzing a website visitor, comprising the steps of:
   a. at a marketing services provider (MSP) server, receiving a request for information from a web browser executing at a consumer device, wherein the web browser had been directed by the website visitor to a website, wherein the website comprises a web beacon, wherein the website is hosted by a web server, and wherein the web beacon operates to redirect the web browser to the MSP server;
   b. redirecting from the web browser to the MSP server, and then reading an identifier stored at the consumer device to determine an anonymous link uniquely associated with a particular consumer, wherein the anonymous link is created in such a manner that no personally identifiable information (PII) can be derived from the anonymous link by a website owner at the web server;
   c. at the MSP server, searching a secure area comprising a plurality of consumer records for at least one record from the plurality of consumer records associated with the anonymous link, wherein the plurality of consumer records in the secure area each comprise data about a particular consumer but exclude PII about any particular consumer, and wherein the anonymous link is not stored in any record containing PII at the MSP server;
   d. recording in an activity database in communication with the MSP server a browsing activity record for a consumer associated with the anonymous link, wherein the browsing activity record does not contain PII;
   e. redirecting the web browser from the MSP server back to the web server, wherein this redirecting step is performed in real time and transparently to the website visitor; and f. sending the browsing activity record from the MSP server to the website owner at the web server.

2. The computer-implemented method of claim 1, wherein the step of providing the browsing activity record comprises the step of providing a report to the website owner.

3. The computer-implemented method of claim 1, wherein the step of reading an identifier stored at the consumer device comprises the step of reading a cookie stored in the web browser operating at the consumer device.

4. The computer-implemented method of claim 3, wherein the cookie comprises the anonymous link.

5. The computer-implemented method of claim 3, wherein the secure area further comprises a cookie table, and further comprising the step of searching the cookie table in order to identify the anonymous link associated with the cookie.

6. The computer-implemented method of claim 1, wherein the secure area comprises data about a plurality of consumers derived from a marketer database.

7. The computer-implemented method of claim 2, wherein the step of providing a report to the website owner comprises the step of periodically providing a report to the website owner.

8. The computer-implemented method of claim 2, wherein the report comprises third-party data.

9. The computer-implemented method of claim 2, wherein the report comprises geographic data.

10. The computer-implemented method of claim 9, further comprising the step of deriving the geographic data from IP addresses for the website visitors.

11. The computer-implemented method of claim 1, further comprising the step of providing the browsing activity record to the website owner in real time.

12. The computer-implemented method of claim 1, wherein steps (a) through (d) are repeated for a plurality of consumer devices.

13. The computer-implemented method of claim 12, further comprising the step of dividing website visitors into segments based upon the browsing activity record provided to the website owner, and providing the segments to the website owner.

14. The computer-implemented method of claim 1, wherein steps (a) through (d) are repeated for a single consumer device over a period of time in response to receiving multiple requests for information from the web browser operating at the consumer device, and wherein the report comprises an association between the multiple requests for information from the web browser for the anonymous link associated with the consumer device.

15. The computer-implemented method of claim 1, wherein the step of, at the MSP server, searching the secure area comprising the plurality of consumer records for at least one record from the plurality of consumer records containing the anonymous link comprises the step of searching a plurality of secure areas, wherein each secure area is associated with a particular marketer.

16. A system for analyzing a website visitor, comprising:
a. a consumer device comprising a web browser and configured to access any of a plurality of websites over the Internet;
b. a plurality of publisher servers, each of the publisher servers comprising one of the plurality of websites and connectable to the consumer device over the Internet, wherein each of the plurality of websites comprises one or more of a web beacon or a web pixel;
c. a marketing services provider (MSP) server connectable to the consumer device over the Internet, wherein the MSP server is configured to receive a call at an IP address associated with the web beacon or web pixel associated with at least one of the plurality of websites;
d. a database in communication with the MSP server, wherein the database comprises a secure area, the secure area comprising a plurality of consumer records, each of the consumer records comprising an anonymous link and demographic data about a particular consumer but excluding any personally identifiable information (PII) about the particular consumer; and
e. a redirect subroutine resident at the MSP server, wherein the redirect subroutine is configured to retrieve at least one browser cookie on the consumer device in response to receiving a call at an IP address associated with the web beacon or web pixel associated with at least one of the plurality of websites, and further wherein the redirect subroutine is configured to perform in real time such that operation of the redirect subroutine is transparent to a user of the consumer device.

17. The system of claim 15, wherein the at least one browser cookie on the consumer device comprises an anonymous link associated with the consumer operating the consumer device.

18. The system of claim 15, wherein the at least one browser cookie on the consumer device contains look-up information, and wherein the database in communication with the MSP server further comprises a cookie look-up table comprising a plurality of browser cookies each matched to an anonymous link.

19. The system of claim 15, wherein the secure area in the database in communication with the MSP server further comprises a store comprising one or more of "in market" data and segment data linked to at least one of the consumer records in the secure area.

20. The system of claim 15, further comprising a real-time reporting subroutine resident at the MSP server, wherein the real-time reporting subroutine is configured to deliver data from the secure area pertaining to a consumer associated with one of the consumer records in the secure area in real time, and further to deliver in real time a targeted advertisement based on the consumer record to the browser of the consumer device.

* * * * *